Figure 1:
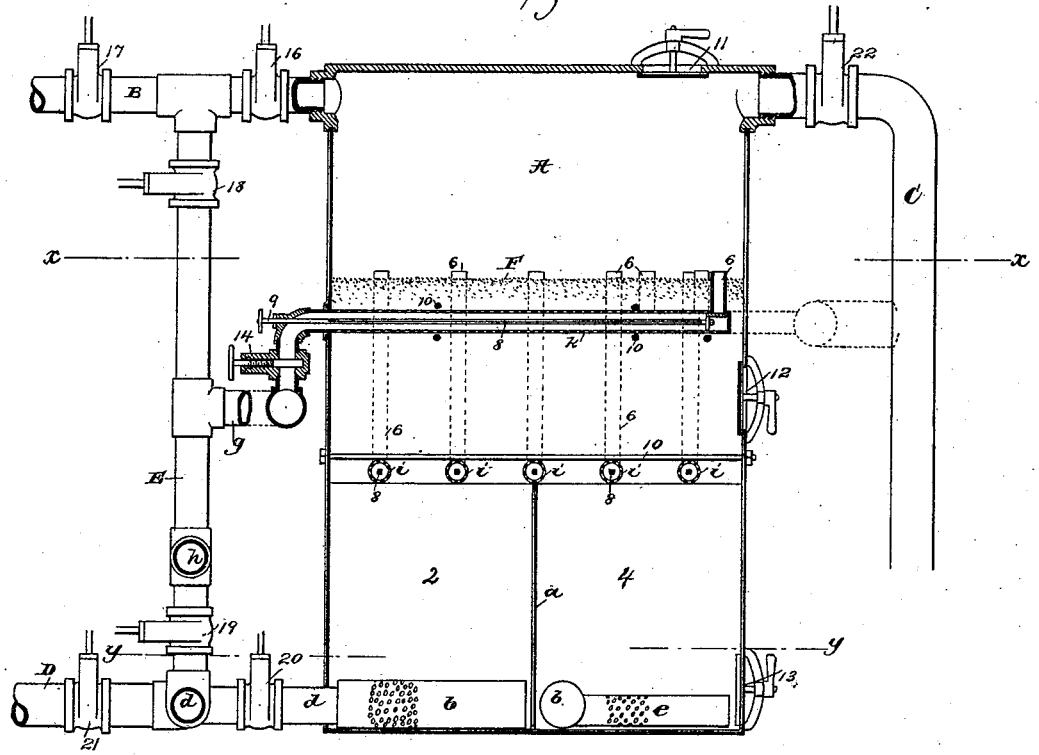

(No Model.) 2 Sheets—Sheet 1.

W. M. DEUTSCH.
FILTER.

No. 355,004. Patented Dec. 28, 1886.

Attest:
J. A. Hovey
Geo. H. Graham

Inventor:
William M. Deutsch
by Numun Philipp
Attys.

(No Model.) 2 Sheets—Sheet 2.
W. M. DEUTSCH.
FILTER.
No. 355,004. Patented Dec. 28, 1886.
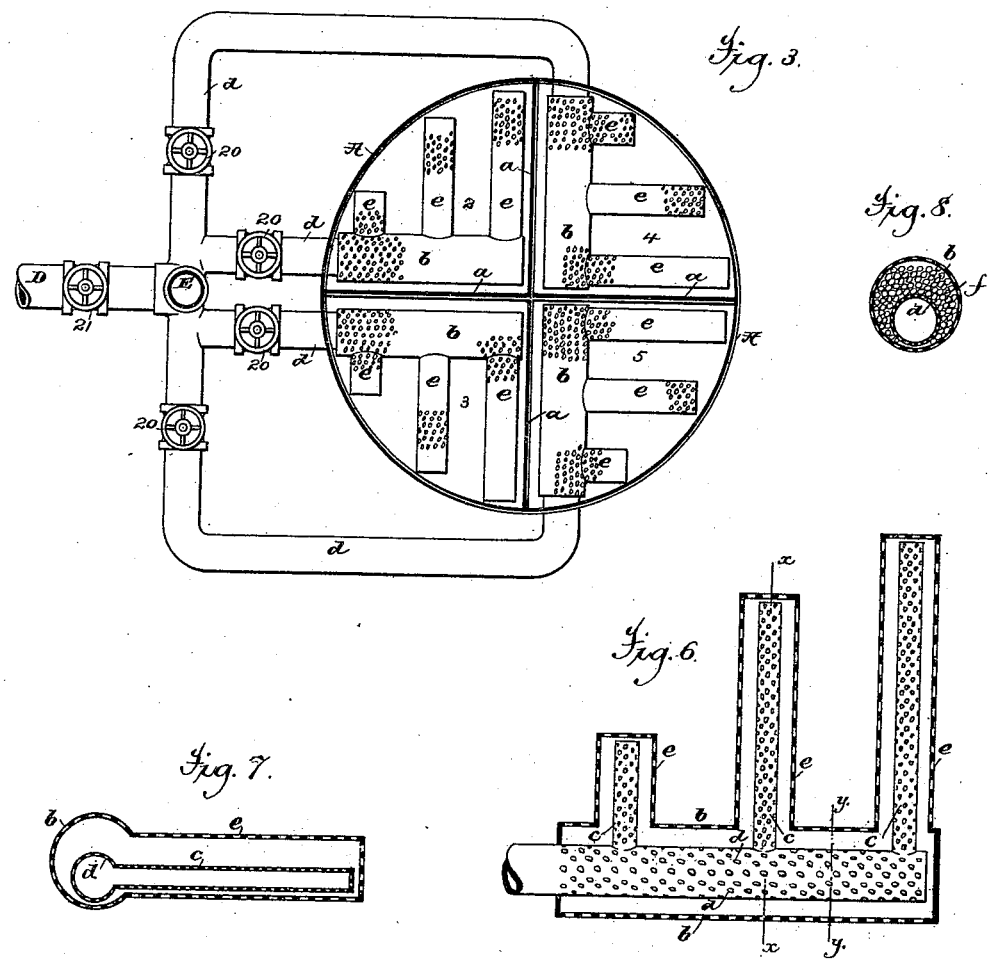
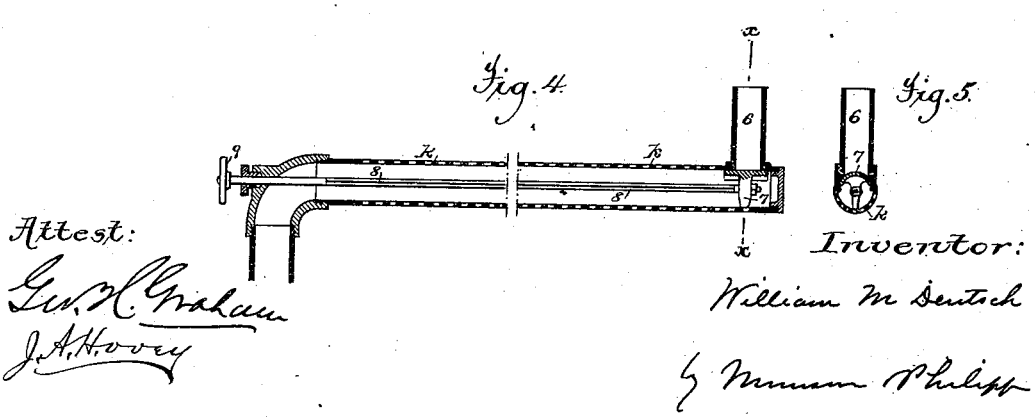
Attest:
Geo. H. Graham
J. A. Hovey
Inventor:
William M. Deutsch
by Numann Philipp
Attys.

UNITED STATES PATENT OFFICE.

WILLIAM M. DEUTSCH, OF ELIZABETH, NEW JERSEY.

FILTER.

SPECIFICATION forming part of Letters Patent No. 355,004, dated December 28, 1886.

Application filed May 10, 1886. Serial No. 201,633. (No model.)

*To all whom it may concern:*

Be it known that I, WILLIAM M. DEUTSCH, a citizen of the United States, residing at Elizabeth, county of Union, and State of New Jersey, have invented certain new and useful Improvements in Filters, fully described and represented in the following specification and the accompanying drawings, forming a part of the same.

This invention relates to that general class of filters in which the purifying or cleansing of the water is accomplished by causing the water to percolate through a body of granular material, and particularly to a filter of this class which is designed for filtering water in large quantities, as for supplying cities and factories. In using filters of this class, particularly where the water filtered contains a considerable quantity of impurities, it is of course necessary from time to time to cleanse the body of filtering material or filtering-bed, as otherwise the continued accumulation in the bed of the impurities removed from the water would prevent the passage of the water through the bed, and thus render the filter inoperative. This cleansing of the bed has usually been accomplished either by forcing the water through the filter in the reverse direction, so that the impurities lodged in the bed during the filtering operation were carried upward out of the bed by the reverse current and conveyed away through a waste-pipe, or by removing the bed from the filter and replacing it with a new bed of clean material, or washing it in any suitable manner and then replacing it. The first of these methods of cleansing the filtering-bed has been found objectionable in practice because of the large amount of water consumed in the cleansing operation, which water in most cases amounted to from one to six per cent. of all the water filtered, and which of course was entirely wasted. The second method of cleansing the filtering-bed has also been found objectionable in practice, not only because of the time consumed in removing and replacing the bed, but because of the considerable labor involved in that operation. In the filters of this class as ordinarily constructed the water, after passing through the bed of granular material, enters the discharge-pipe of the filter either through perforations formed in the end of the pipe or in a plate or diaphragm located in the bottom of the filter, the purpose of the perforations being to prevent the granular material of the bed from being carried into the discharge-pipe. This arrangement has not, however, proved entirely successful. If the perforations were made sufficiently small to arrest the smaller particles of the bed and prevent them from passing into the discharge-pipe, then they were liable to become clogged so as to prevent the free entrance of the water into the pipe, while, on the other hand, if the perforations were made sufficiently large to prevent liability of clogging they would permit the passage of some of the smaller particles of the bed, and thus some portion of the bed would be carried into the discharge-pipe and either clog the pipe or be delivered with the filtered water. Various expedients have been resorted to to obviate this difficulty, none of which, however, have proved entirely satisfactory in practice.

It is the object of the present invention to produce a filter which shall be free from the objectionable features, hereinbefore mentioned, which have existed in the filters of this class heretofore constructed.

To that end the invention consists in certain novel features of construction and in certain combinations and arrangements of parts, which will be hereinafter particularly explained and pointed out.

As a full understanding of the invention can be best imparted by a detailed description of a filter embodying the same, all preliminary description will be omitted and a full description given, reference being had to the accompanying drawings, in which—

Figure 2:
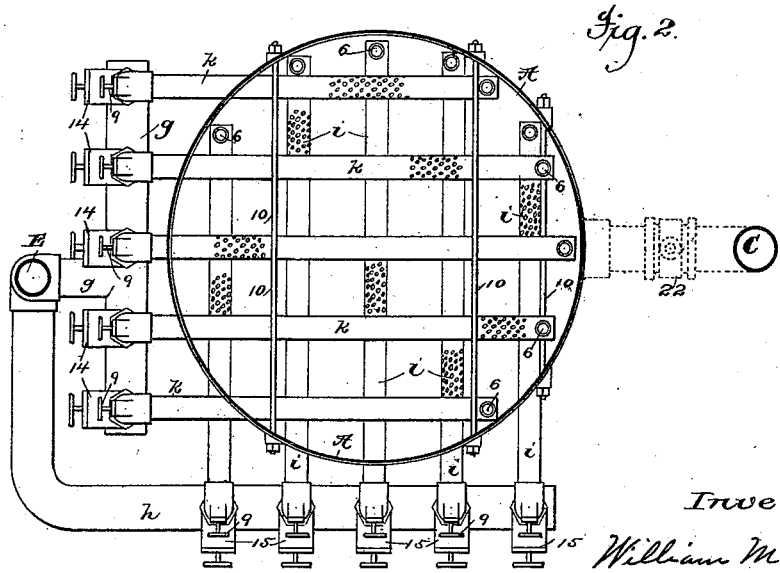

Figure 1 is a sectional elevation of a filter constructed according to the present invention. Fig. 2 is a horizontal section of the same, taken on the line $x$ $x$ of Fig. 1. Fig. 3 is a horizontal section of the same, taken on the line $y$ $y$ of Fig. 1. Fig. 4 is an enlarged view of a part of Fig. 1, showing one of the washing-pipes. Fig. 5 is a vertical section of the same, taken on the line $x$ $x$ of Fig. 4. Fig. 6 is an enlarged horizontal section showing the construction of the pipes through which the water is discharged from the filter. Fig. 7 is a vertical section taken on the line x x of Fig. 6, and Fig. 8 is a cross-section taken on the line y y of the same figure.

Referring to said drawings, it is to be understood that the body A of the filter, or what will be termed the "filter," is of any of the usual forms. As herein shown, it is of cylindrical form and of a height equal to about twice its diameter; but it may be of any other form and of other proportions to suit the location in which it is to be used. The filter, as herein shown, is closed at its top; but if the top of the filter is located above the level of the source from which the water is drawn, it may be open. The filter is connected at a point near its top with the induction-pipe B, through which the water enters the filter, and is also provided, near its top, with a waste-pipe, C, the purpose of which will be hereinafter explained. The filter, as shown in the present case, is provided with two vertical partitions, $a$, which extend from its bottom upward about one-half of its height, and thus divide the bottom portion of the filter into four compartments, 2 3 4 5, as shown in Fig. 3.

The discharge-pipe D, through which the water passes after being filtered, is provided with four branches, $d$, which enter the filter at its bottom and lie horizontally on the bottoms of the compartments 2 3 4 5, extending to points near the center of the filter, as also shown in Fig. 3. The branches $d$ are provided inside the filter with a number of smaller lateral branches, $c$, which extend horizontally along the bottoms of the compartments 2 3 4 5, and these branches, and also the portions of the pipes $d$ which lie inside the filter, are perforated, as shown in Figs. 6, 7, and 8. The branches $c$, and also the perforated portions of the branches $d$, are surrounded by pipes $e\ b$, which are of considerably larger size, and are also perforated. The spaces thus formed between the pipes $c\ d$ and the inclosing-pipes $e\ b$ are filled with a coarse granular material, such as fine gravel or pebbles $f$, as shown in Fig. 8. The purpose of this construction and arrangement will be made clear when the operation of the filter is explained. The gravel $f$ is not shown in Figs. 6 and 7, because the showing of it in these figures would tend to obscure the other parts.

The induction-pipe B is connected to the discharge-pipe D outside the filter by a vertical pipe, E, which is provided with two lateral branches, $g\ h$. The branch $g$, which is the upper one of the two, is provided with a number of branches, $k$, which extend either upward or downward (upward, as shown) outside the filter, and then bend and enter and extend horizontally into the filter at about two-thirds its height. The branch $h$, which is the lower one of the two, is also provided with a number of branches, $i$, which are arranged similar to the branches $k$ and extend horizontally into the filter at right angles to the pipes $k$, and at about one-third its height.

The portions of the pipes $i\ k$ which lie inside the filter are perforated, as shown in Fig. 4, and each of the pipes is provided at its inner end with a vertical branch, 6, which extends upward to a point just above the surface of the bed, and is open at its upper end, as shown in Figs. 1, 4, and 5. Each of the pipes $i\ k$ is provided with a valve or gate, 7, which controls the opening of its branch 6, and is provided with an operating-rod, 8, which extends the length of the pipe, as best shown in Fig. 4, and passes outward through a stuffing-box, where it is provided with an operating-handle, 9. The pipes $i\ k$ are supported upon suitable tie-rods 10, which extend horizontally across the filter, as shown. The filter is also provided with suitable hand-holes, as 11 12 13, through which access can be had to its interior at various points.

The several pipes hereinbefore described are provided with valves or gates arranged as follows: The induction-pipe B is provided with valves 16 17, located, respectively, upon the opposite sides of its connection with the pipe E. The pipe E is provided with valves 18 19, located, respectively, above and below its connection with the pipes $g\ h$. The discharge-pipe D is provided with a valve, 21, located outside of its connection with the pipe E. The pipes $d$ are provided with valves 20, located outside the filter. The pipes $k$ are provided with valves 14, and the pipes $i$ with valves 15, located outside the filter, and the waste-pipe C is provided with a valve, 22. The purpose of these several valves or gates will be made clear when the operation of the filter is explained.

The filtering-bed F, which is composed of any suitable granular material, is placed in the bottom of the filter and fills the compartments 2 3 4 5 and the filter to a point about three or four inches above the pipes $k$ and slightly below the upper ends of the vertical pipes 6, as indicated in Fig. 1.

The operation of the filter thus constructed is as follows: When the filter is in ordinary operation, the valves 16 17 and 20 21 will be opened and the valves 14, 15, 18, 19, and 22 will be closed. The water will then enter the filter through the induction-pipe B, and will percolate downward through the filtering-bed F, depositing all impurities therein, and will then pass through the perforations in the pipes $e\ b$, thence through the granular material surrounding the pipes $c\ d$ and through the perforations in said last pipes, and will then be discharged through the branches $d$ and discharge-pipe D. During this operation some of the finer particles of the granular material of which the bed is composed will be carried through the perforations in the pipes $e\ b$; but any portions of the filtering material which are thus carried into the pipes $e\ b$ will be lodged in the interstices among the granular material $f$, and be prevented from being carried through the perforations in the pipes $c\ d$ and into the discharge-pipe.

It has been found in practice that in using a filter of this character the greater portion of the impurities contained in the water is lodged in the upper portion of the bed—that is to say, if the water percolates through the bed simply by gravity, as when the filter is located on or nearly on a level with the source from which the water is drawn, the impurities will be mostly deposited in the first inch or two of the filtering material at the top of the bed, while if the water is under the pressure the impurities will be mostly deposited within from two to eight or ten inches of the top of the bed, depending upon the pressure to which the water is subjected. From this it will be seen that in any case the upper portion of the bed becomes foul and requires cleansing much more frequently than the lower portions of the bed. When, however, as has heretofore been customary, the cleansing of the bed is accomplished by sending a reverse current of water through the discharge-pipe, it is evident that the whole bed, including the lower and comparatively clean portion, must be washed each time it becomes necessary to clean the upper and foul portion of the bed. This frequent washing of the whole bed not only, as before stated, consumes a considerable amount of time, but also consumes a large amount of water—usually from one to six per cent. of all the water filtered—which water goes to waste, and thus makes the washing of the bed expensive, particularly where the water is supplied by pumping. By the construction shown in the present case this is largely avoided. After the filter has been in use for a time and the top of the bed has become so foul as to need cleaning, the valves 16 and 20 are closed and the valves 19, 14, and 22 opened. The filtered water is then forced or allowed to flow back through the pipe D and up through the pipe E, and into the pipes k, where it will issue through the perforations in said pipes k and pass upward through the small amount of the bed above those pipes. The upward currents thus formed will agitate the upper part of the bed and carry up out of the granular filtering material all the impurities accumulated therein, which impurities, being lighter than the material of the bed, will be carried to the top of the filter and out through the waste-pipe C. By this means the top of the bed, which contains the greater part of the impurities taken from the water being filtered, will be cleaned in a few minutes, and by the use of only a small amount of water.

Any particles of the granular material of the bed which may have passed through the perforations in the pipes k during the filtering process may be removed from these pipes by opening the valves 7 and turning the rods 8, which, as will be observed, are square, so as to loosen the particles of the filtering material in the pipes. The water admitted to the pipes at the commencement of the washing operation will then drive such accumulated particles up through the vertical pipes 6 and deposit them on the top of the bed F, after which the valves 7 will be closed. After the top of the bed has been thus washed the valves 22, 14, and 19 will be closed and the valve 16 and 20 opened and the filtering proceeded with.

The operation just described will be repeated as often as may be necessary.

After the filter has been in use for some time the bed F will become foul to a greater depth than the pipes k. When this takes place, the washing operation just described will be repeated, except that the valves 15, instead of the valves 14, will be opened, so as to allow the washing-water to enter the pipes i. By this means the bed may be cleaned down to the level of the pipes i. The pipes i may be freed of any particles of the granular filtering material which may have been carried into them through their perforations by opening the valves 7, the same as already described in connection with the pipes k.

It will be observed not only that the washing-pipes k i are straight pipes, but that each one of them is arranged to receive its washing-water independent of the others. By making these pipes straight the valve-rods 8 are allowed to extend the length of the pipes, as shown, and thus by making the rods 8 square a means is afforded for loosening the granular material of the bed, which will accumulate and pack in the pipes k i during the filtering operation, so as to allow it to be driven out by the washing-water. By arranging the connections so that the washing-pipes are supplied with water independent of each other a practically uniform pressure is obtained in all of the pipes, which would not be the case if the several pipes of each series were connected together so as to form one continuous pipe.

After the bed has been for a long time in use—say several days—under ordinary circumstances, the whole bed will require cleaning, and when this occurs the washing may be effected by closing the valve 16 and opening the valve 22. The water sent in the reverse direction through the pipe D will then pass into the pipes d c and issue through the perforations in those pipes, and after passing through the gravel f issue through the perforations in the pipes b e and pass upward through the bed. As the water passes out through the gravel f, it will agitate the gravel, which, as will be observed, does not quite fill the spaces between the pipes c d and the pipes b e, and thus carry any particles of the granular material of the bed which may have passed through the perforations in the outer pipes and lodged among the gravel back through the perforations and restore them to the bed. When the whole bed is to be washed, as just described, it will usually be most desirable to close three of the valves 20, so as to admit the washing-water into only one of the compartments 2 3 4 5 at a time. By this means, and by the partitions a, the pressure in the pipe D is concentrated on the small portion of the bed in and directly over one of the compartments, and thus the bed is agitated more violently and the washing correspondingly expedited.

By means of the construction and operation which has been described the filter is kept in good working order without the necessity of washing the whole bed except at comparatively long intervals, and thus a great saving of time is effected and also a great amount of water is saved; whereas in a filter in which the whole bed is washed each time the top portion of the bed becomes foul, it requires from one to six per cent. of the water filtered to keep the bed properly washed. In the present filter the bed is kept properly cleansed by the use of from one-tenth to one-fourth of one per cent. of the water filtered.

In some cases it may be found most desirable to wash the bed with unfiltered instead of filtered water. The construction shown permits of this, when desired. To do this it is only necessary to close the valve 21 and open the valve 18, and operate the other valves in the same manner as already described.

In conclusion it is to be remarked that while the construction and organization shown embodies the invention in its most complete and desirable form, it may be modified in many particulars without departing from the essential features of the invention. The number and arrangement of the pipes $i\,k$ may be varied, and when it is desired to wash only with filtered or only with unfiltered water these pipes may be connected only with the discharge or induction pipe, as the case may be. Only two series of these pipes are shown in the present case, because two series will usually be all that will be required; but it is to be understood that three or more series arranged at different levels in the bed may be provided if in any case it should be found desirable to employ more than two; or in some cases it may not be desirable or necessary to provide more than one series of these washing-pipes. The number and location of these washing-pipes will depend largely upon the condition of the water being filtered.

In some cases it may not be found necessary to provide the pipes $i\,k$ with the valves 7 and pipes 6, and in some cases it may be found most advantageous to provide for clearing the pipes $i\,k$ by extending these pipes through the opposite side of the filter and connecting them to a cross-pipe, which is connected by a branch with the waste-pipe C, as indicated by dotted lines in Fig. 1. The form and arrangement of the pipes $c\,d$ and $e\,b$ may also be varied, and the vertical partitions $a$ may be arranged to divide the lower part of the filter into a greater or less number of compartments than shown without departing from the invention.

Although the partitions $a$ perform an important function, as before explained, they may be entirely omitted and yet preserve certain parts of the invention. If the partitions $a$ are omitted, the branch pipes $d$ may of course be arranged in any convenient manner.

The pipes $e\,b$ may be perforated around their entire circumference, as shown, or, if preferred, they may be perforated for only a part of their circumference, say two-thirds, (more or less.) So, also, the pipes $c\,d$, instead of being arranged eccentrically of the pipes $e\,b$, may be arranged concentric with said pipes.

It is also to be remarked that in some cases it may be found desirable to force compressed air into the pipes with the washing-water. Air used in this manner will aid in agitating the granular material of the bed, and will thus aid the water in removing the impurities from the bed. In some cases air alone may be forced through the pipes into the bed. In such case a small amount of water will be allowed to run in through the induction-pipe, and the air passing upward through the bed will agitate the granular material of the bed and carry the impurities to the surface of the water, where they will flow out through the waste-pipe.

The filter discharge-pipe provided with several branches having valves or cocks for directing the full force of the current through different portions of the filter-bed in cleansing the same, and also the combination, with a filter having its bottom portion divided into a number of compartments, of the discharge-pipe arranged to communicate with each compartment separately, is not herein claimed, as this subject-matter is claimed in an application filed by me on September 4, 1886, Serial No. 212,660.

What I claim is—

1. The combination, with the filter and filtering-bed, of the perforated washing-pipes $k$, arranged horizontally in and a short distance below the top of the filtering-bed and extending substantially across the whole filtering-bed, and supplying washing-water throughout the whole upper area of the same at one and the same time, and connected separately to the pipe through which the washing-water is supplied, substantially as described.

2. The combination, with the filter, of a plurality of series of perforated washing-pipes, $i\,k$, arranged horizontally in the filtering-bed at different heights, and connections for sending the washing-water into either of said series of pipes, substantially as described.

3. The combination, with the filter and its induction and discharge pipes, of the perforated washing-pipes $k$, arranged horizontally in and a short distance below the top of the filtering-bed and connected separately to the pipe through which the washing-water is supplied, and connections between said last pipe and the induction and discharge pipes, whereby the top of the bed may be washed with either filtered or unfiltered water, substantially as described.

4. The combination, with the filter and its induction and discharge pipes, of a plurality of series of perforated washing-pipes arranged horizontally in the filtering-bed at different heights and connections between said washing-pipes and both the induction and discharge pipes, whereby the bed may be washed with either filtered or unfiltered water, substantially as described.

5. The combination, with the horizontal perforated washing-pipes having the vertical branches 6 at their ends, of the valves 7, for opening communication between the washing-pipes and said branches, substantially as described.

6. The combination, with the horizontal perforated washing-pipes, of the rods 8, extending the length of said pipes, whereby the granular material in said pipes may be loosened so as to be carried out by the washing-water, substantially as described.

7. The combination, with the filter and the filtering-bed and the discharge-pipe located in the bottom of the bed, of a perforated pipe surrounding the discharge-pipe and providing a space between the two, substantially as described.

8. The combination, with the filter and the filtering-bed, of a perforated discharge-pipe located in the bottom of the bed, a perforated pipe surrounding said perforated discharge-pipe, and a body of coarse material, $f$, located in the space between the two pipes, substantially as described.

9. The combination, with the filter having its bottom portion divided into a number of compartments by vertically-arranged partitions, of a discharge-pipe having perforated branches which communicate with each compartment separately, perforated pipes inclosing the perforated portion of each of said branches, and bodies of coarse material $f$, located in the space between said pipes, substantially as described.

In testimony whereof I have hereunto set my hand in the presence of two subscribing witnesses.

WILLIAM M. DEUTSCH.

Witnesses:
JAMES A. HOVEY,
JAS. J. KENNEDY.